Patented Sept. 29, 1936

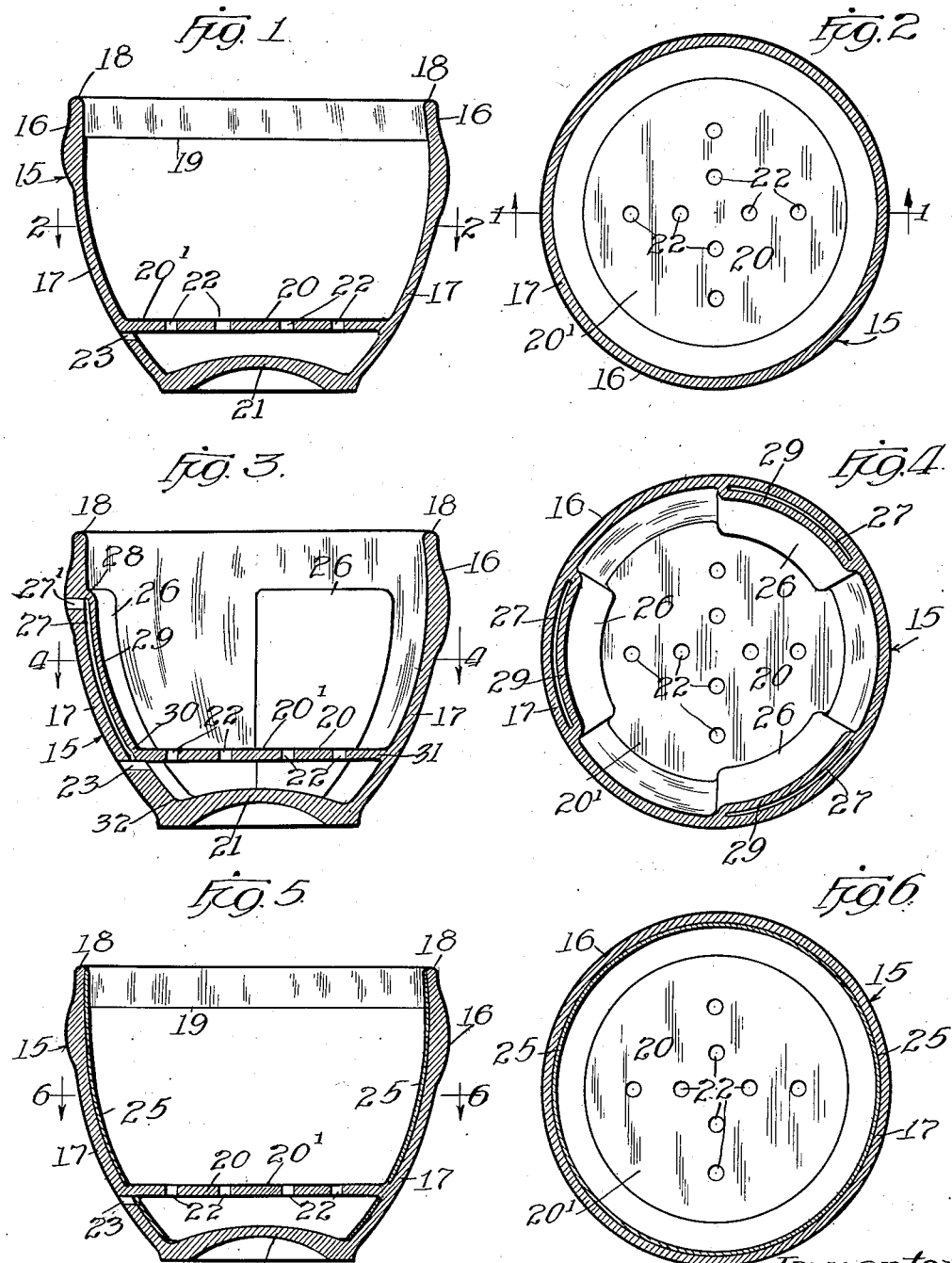

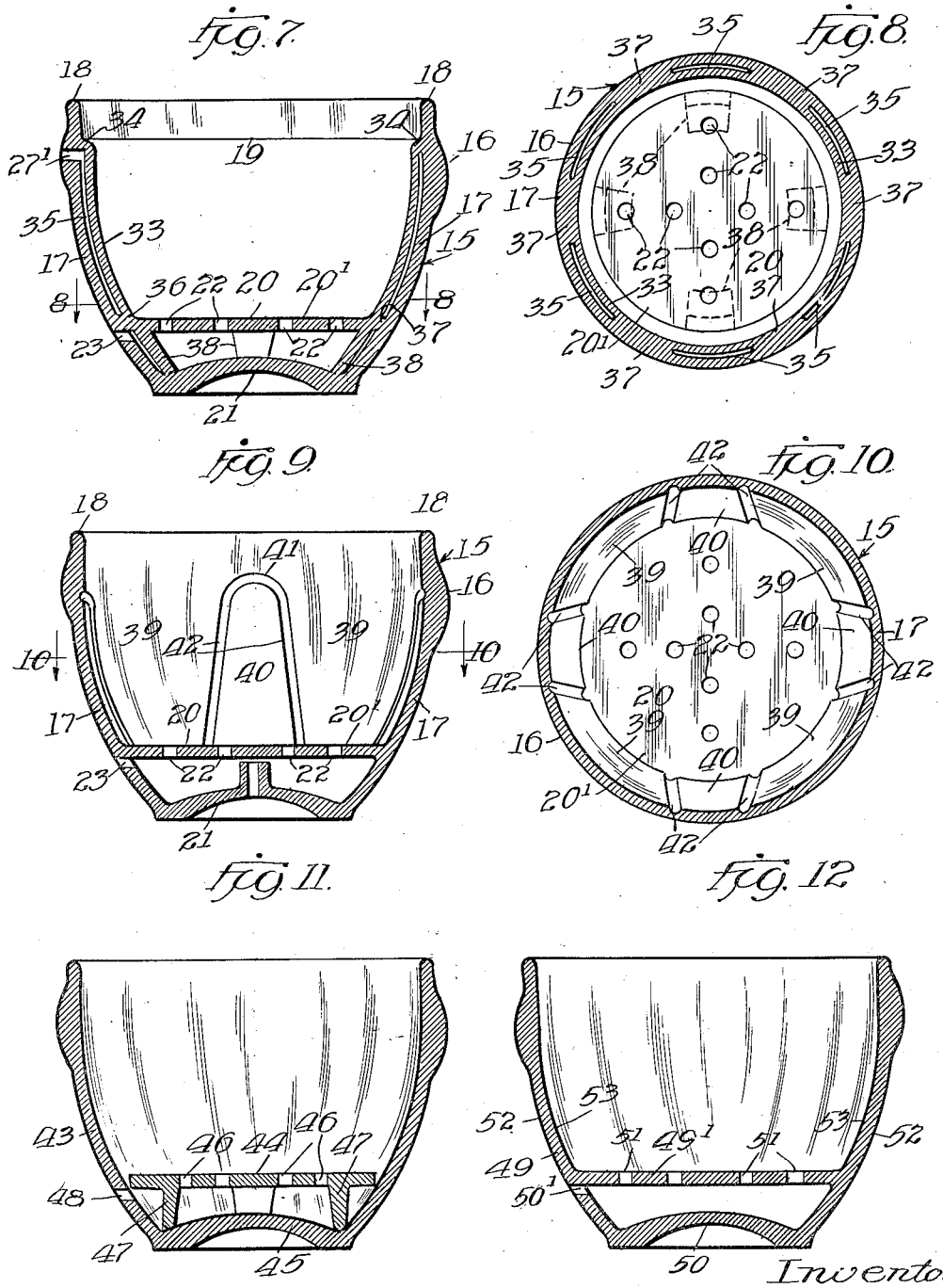

2,055,844

UNITED STATES PATENT OFFICE 2,055,844

SELF WATERING FLOWER VESSEL

Harry D. Kneller, Brookfield, Ill.

Application June 17, 1935, Serial No. 27,026

9 Claims. (Cl. 47—38)

This invention relates to improvements in flower pots.

So far as I am aware, in order to provide an artistic and finished appearance to flower pots, it has been the practice to provide an outer vessel and an inner pot. The inner pot is of the common unglazed earthen-ware kind, and the outer pot is glazed both inside and out.

The unglazed inner pot contains the plant and the outer pot is merely to give a pleasing or finished artistic appearance. Such outer pots are commonly designated "jardinieres".

It is a principal object of my invention to combine in one article the functions of the usually used inner and outer pots, or in other words, to provide an outer pot or jardiniere which will also function as a pot for holding growing plants.

The particular function to be added to the usual jardiniere is that of carrying the moisture from the bottom of the pot to the earth in the upper part of the pot.

It is well known that this function cannot be attained by a pot, the inner surface of which is glazed, as the glazing destroys the capillary action of the wall of the pot which is necessary for this transfer of moisture, and is the reason that common flower pots are made of unglazed earthen-ware.

I have devised several different ways of adding this function to what appears to be a usual jardiniere.

A simple form of my invention is to make a jardiniere and then apply glazing to the outer surface thereof and to the upper portion of the inner surface down at least to the usual top surface of the contained earth. The balance of the inner surface and the upper surface of the bottom is left unglazed.

In addition to the above, I arrange a false perforated bottom raised above the true bottom of the jardiniere to provide a well to hold water and I provide an over-flow opening just below the false bottom to prevent water standing in the jardiniere above the false bottom.

In addition to the above I may provide, in some forms additional inner unglazed walls spaced from the outer wall of the jardiniere to form air passages leading from the false bottom up to a point adjacent to the usual top surface of the soil in the pot.

In some forms I may glaze portions of the inner surface of the jardiniere leaving vertically extending sections unglazed, and these sections spaced substantially uniformly around the inner surface so as to distribute the water substantially to all portions of the soil in the pot.

But in substantially all forms, the pot preferably has a glazed, finished, artistic appearance, and the usual separate, unglazed earthern-ware pot is dispensed with.

For the purpose of accomplishing the above and other advantages and objects, the invention consists in the means herein fully disclosed and particularly pointed out in the appended claims, the accompanying drawings, forming part of this specification, and the following description setting forth in detail but a few embodiments of the invention, such disclosed arrangements constituting, however, but exemplifications of the application of the principle of the invention rather than a disclosure of the many forms which will readily suggest themselves to one skilled in the art.

The invention will be more readily understood by reference to said drawings in which:—

Fig. 1 is a vertical central section on the line 1—1 of Fig. 2, of a flower pot which embodies the invention in a simple form;

Fig. 2 is a horizontal section on the line 2—2 of Fig. 1;

Fig. 3 is a sectional view similar to Fig. 1, but showing a slightly different form of the invention.

Fig. 4 is a horizontal section on the line 2—2 of Fig. 3;

Fig. 5 is a sectional view similar to Fig. 1, but showing another simple form of the invention;

Fig. 6 is a horizontal section on the line 6—6 of Fig. 5;

Fig. 7 is a sectional view similar to Fig. 1, but showing another slight modification of the invention;

Fig. 8 is a horizontal section on the line 8—8 of Fig. 7;

Fig. 9 is a section similar to Fig. 1, but showing another slight modification of the invention;

Fig. 10 is a horizontal section on the line 10—10 of Fig. 9;

Fig. 11 is a sectional view similar to Fig. 1 but showing a jardiniere which is glazed both outside and inside and provided with means for converting it into a pot in which flowers can be grown; and Fig. 12 is a sectional view similar to Fig. 1, but showing a slight modification of the invention.

In said drawings 15 represents a flower pot of the jardiniere kind, having its outer surface 16 of its wall 17 glazed, and preferably having the glazing extending down within the pot from the upper edge 18 to at least the usual height of the earth within the pot as designated by the line 19.

The pot is made of the clay usually used for common unglazed flower pots and the walls of which are sufficiently porous so that they will raise water from the bottom of the pot to the earth within the pot and tend to keep the plant in the pot properly supplied with moisture.

In order to afford space for water and yet retain the roots of the plant out of direct contact with the water supply, I provide a false bottom 20 arranged horizontally and raised above the regular bottom 21 of the pot.

The false bottom 20 is made integral with the wall 17 of the pot in the baking process and the result is a unitary article without any loose or separate pieces which might become lost or broken.

The false bottom 20 is perforated as shown at 22 so that any excess water placed in the pot will readily drain down into the bottom part of the pot below the false bottom. To prevent the water in the bottom of the pot closing the openings 22 or contacting with the false bottom I provide an overflow opening 23 in the side wall of the pot and below the false bottom 20. Preferably the false bottom 20 is glazed at least on its upper surface as indicated by the heavy line 20', to cause the surplus water to drain out quickly through the drain holes 22.

The inside glazing at the top of the pot gives a finished appearance to the pot on the inside and with the outside of the pot glazed and as is usual in various combinations of colors, the pot has an artistic and pleasing appearance.

With the elimination of the usual glazing from the portion of the inside of the pot which is commonly filled with earth, the one pot serves the two purposes of an artistic jardiniere and a pot within which plants can be grown. This is not the case with the usual jardiniere which is glazed substantially all over both outside and inside.

In order that a single pot of this kind will keep the plants alive indefinitely and with a minimum of attention, I provide the perforated false bottom above the regular bottom and also the overflow opening to limit the height of the water and to serve as an air inlet to the space below the false bottom.

Sometimes it is desirable to make the body of the pot of material which when fired is not porous enough to serve the purpose of raising the water from the bottom of the pot. In order to successfully use such material for the body of the pot and which material is often better adapted to properly take the glaze, I apply an inner coating of material as shown at 25, Fig. 5, which when fired will provide the desired porosity.

The upper portion of the porous lining is shown in Fig. 5 as covered with glazing down to the line 19.

In Figs. 3 and 4, I have shown another means of adding to the water lifting effect of the pot particularly when the wall 17 is made of material which is not porous enough for the purpose. This means consists of an inner porous wall 26 spaced from the outer wall 17 to provide an air space 27 between said inner and outer parts of the wall of the pot. The inner wall 26 is preferably made in sections, as shown in Figs. 3 and 4 where three of these sections are shown spaced apart circumferentially by intervening portions of the substantially non-porous wall 17. The top edge 28 of the inner wall 26 and the side edges 29 of these inner sections are made integral with the outer wall 17 and preferably the false bottom 20 is made integral with the bottom of the inner wall, that is with the lower edges 30 of the sections as well as with the outer wall 17 between the sections as indicated at 31, Fig. 3. This construction provides that the lower ends of the air spaces 27 shall open freely into the pot below the false bottom to permit the free entrance of air into the air spaces 27. In order to permit circulation of air through the air spaces 27, I provide vent openings 27' preferably in the outer wall 17 of the pot and adjacent to the tops of the spaces 27. The sections 26 extend down to the regular bottom 21 of the pot as shown at 32 so that they can absorb water from the supply and carry it up into the pot.

In Figs. 7 and 8 I have shown a form of the invention which has some advantages in production.

In this form I provide an inner wall 33, which is in the form of an inner pot, that is, its wall extends clear around, and it is fused at its upper edge 34 to the outer wall 17, thus providing an air space 35 which extends clear around the pot.

To properly set and hold the lower end 36 of the inner pot concentric with the outer wall 17 and provide water passage connection between the two walls, I provide a number of spacers 37 regularly spaced around the pot.

This form of construction can best be used when the outer wall is fairly porous. But in order to enhance the delivery of the water to the inner wall, integral porous projections 38 are provided on the inner structure arranged and adapted to extend down into the water in the bottom of the pot.

With some materials it is difficult to retain the inner glazing in position to cause its lower edge to be regular, as the glazing tends to run down the inner surface of the pot during the firing process. Furthermore it is not always necessary to have the whole inner surface of the pot below the line 19 unglazed as sufficient capacity for the raising of the water is provided by much less than the whole inner surface. Accordingly, I sometimes apply glazing to considerable of the inner surface of the pot as shown at 39, Fig. 9, leaving several parts of the inner surface such as those shown at 40, unglazed. These surfaces 40 extend up from the false bottom 20 and end at a distance below the top of the pot about the same as the line 19, Fig. 1. To prevent the glazing from running down on the surfaces 40, I provide a deflecting shoulder 41 at the margin of the surface 40 which guides the glazing away from the surface 40. The shoulder 41 may be produced by providing a shallow groove 42, or by thickening the wall 17 of the pot to form the unglazed portions 40.

A very simple form of the invention for making a glazed pot available as a pot to contain growing flowers is shown in Fig. 11.

The pot 43 as shown is an ordinary jardiniere glazed both inside and out. I provide a false bottom 44 raised above the regular bottom 45 of the pot 43 and provided with drain holes 46. The false bottom 44 is held in raised position by integral downwardly extending legs or projections 47 which extend down into the lower part of the pot and are supported on the bottom 45 thereof. The false bottom 44 is porous and unglazed and the supports 47 are porous. This construction is effective to raise water from the bottom of the pot and feed it to the earth resting on the false bottom, and is useful in the growing of many plants. To prevent the accumulated water in the lower part of the pot rising to the false bottom and to provide an air inlet, I provide an overflow or water limiting opening 48 in the wall of the pot just below the position of the false bottom 44.

In Fig. 12, I have shown another simple form of the invention.

In this form I provide a pot 49 and a false bottom 49' raised above the real bottom 50 of the pot. The false bottom 49' is made integral with the body of the pot and is provided with the usual drain openings 51. The wall of the pot is provided with an overflow and air opening 50' similar to those already described.

Both the pot itself and the false bottom are made of porous material so that the wall of the pot raises the water from the bottom of the pot to the porous false bottom 49' which feeds it to the earth thereon.

The outer surface of the pot and its inner surface from the top edge down to the false bottom are glazed as shown at 52 and 53 respectively.

This is a very simple form of the invention and is useful in the growing of many plants.

As many other modifications of my invention will readily suggest themselves to one skilled in the art, I do not limit or confine the invention to the specific details of construction or operation herein shown and described.

I claim:

1. A flower pot of the kind described, made of the usual flower pot material having an outer wall, a bottom and an exposed inner surface adjacent covered areas of inner surface, inner wall sections spaced from the outer wall and extending from the bottom of the pot to a point below the top of same, said sections being spaced apart around the pot and fused at their side edges and tops to the outer wall of the pot and covering the underlying areas of the inner surface of the outer wall, a false, perforated bottom arranged above the bottom of the pot and fused at its outer edge to the inner and outer walls of the pot, the outer surface of the pot being glazed and the exposed inner surface of the outer wall being glazed.

2. A flower pot having a glazed outer surface, a false perforated bottom above the regular bottom of the pot, the pot being provided with an overflow opening below the false bottom, the inner surface of the pot being substantially non-porous in its upper edge portion and having separated porous sections, and the non-porous surface extending from said upper portion down to the false bottom between said separated porous sections.

3. In a flower pot, a single-walled body having side walls and a bottom and open at its top, the interior of the walls being of porous material, a false bottom of porous material in the lower part of the pot, said false bottom being perforated, there being an opening through the wall of the pot below the false bottom, the outer surface of the body being glazed and the glazing extending over the upper edge of the pot and down within the pot substantially to the line to which the pot is ordinarily filled with earth.

4. A flower pot having an upper part terminating in an upper edge and a lower part, a glazed outer surface, the upper part of the inner surface also being glazed near the upper edge, the inner surface below said glazed upper part having spaced unglazed areas, deflecting shoulders bordering said unglazed areas and defining their upper and lateral edges, a false bottom in the pot spaced above the regular bottom, the inner glazing extending from said upper part down to the false bottom in sections separated by said unglazed areas.

5. The invention as defined in claim 4, the deflecting shoulders being formed by shallow grooves.

6. The invention as defined in claim 4, the unglazed areas projecting into the pot and providing said deflecting shoulders.

7. An integral one-piece flower pot having inner walls and outer walls, the inner walls extending from the bottom of the pot to a point below the top thereof and spaced from the outer walls, and a false bottom above the regular bottom of the pot and connected to the inner walls thereof, the outer surface of the pot being glazed, and the inner walls having porous areas and substantially non-porous areas between said porous areas and spacing said porous areas apart circumferentially.

8. The invention as defined in claim 7, the false bottom being perforated, and the pot being provided with an overflow below the false bottom and with an air vent adjacent to the top of the space between the inner and outer walls.

9. A flower pot having side walls of porous material and a bottom and open at its top, the outer surface of the side walls of the pot being glazed, the inner surface of the pot adjacent its top being non-porous, by glazing of the porous material of said side walls, a false bottom of porous material in the lower part of the pot, said false bottom being perforated, there being an opening through the side of the pot below the false bottom, and the upper surface of said false bottom being glazed.

HARRY D. KNELLER.